Figures 1, 2:
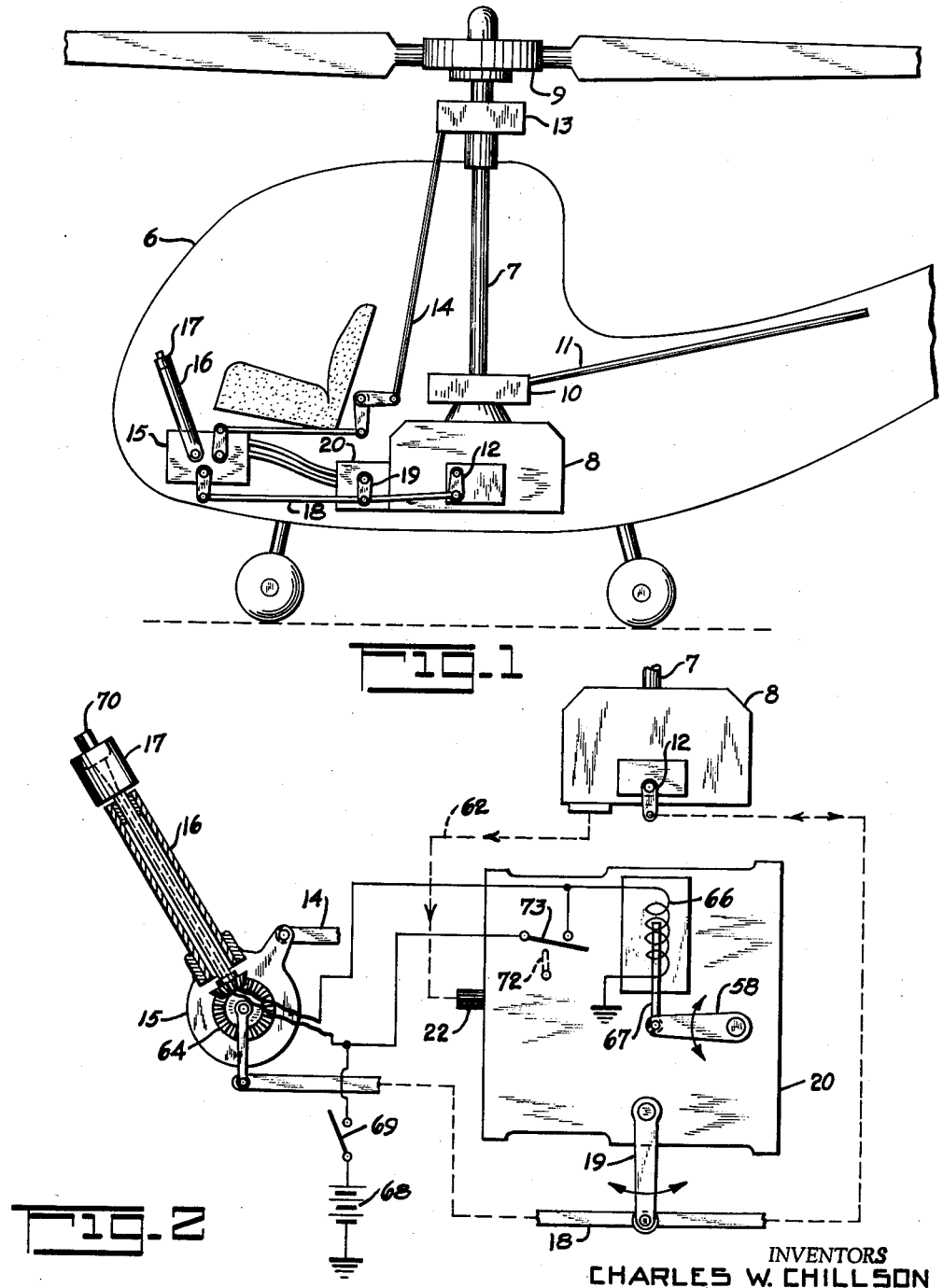

Jan. 15, 1963 C. W. CHILLSON ETAL 3,073,328
HELICOPTER SPEED CONTROL SYSTEM
Original Filed April 10, 1956 3 Sheets-Sheet 1

INVENTORS
CHARLES W. CHILLSON
EDWARD K. HINE
BY

HIS ATTORNEY

Jan. 15, 1963  C. W. CHILLSON ETAL  3,073,328
HELICOPTER SPEED CONTROL SYSTEM
Original Filed April 10, 1956  3 Sheets-Sheet 2

INVENTORS
CHARLES W. CHILLSON
EDWARD K. HINE
BY
*William V. Ebs*
HIS ATTORNEY

INVENTORS
CHARLES W. CHILLSON
EDWARD K. HINE
BY
William V. Ebs
HIS ATTORNEY

United States Patent Office 3,073,328
Patented Jan. 15, 1963

3,073,328
HELICOPTER SPEED CONTROL SYSTEM
Charles W. Chillson, Packanack Lake, and Edward K. Hine, North Caldwell, N.J., assignors to Curtiss-Wright Corporation, a corporation of Delaware
Original application Apr. 10, 1956, Ser. No. 577,229, now Patent No. 2,957,687, dated Oct. 25, 1960. Divided and this application Jan. 2, 1959, Ser. No. 784,677
5 Claims. (Cl. 137—18)

This invention relates to speed control arrangements for rotary wing systems, as on helicopters, and more particularly includes a rotor speed responsive governor, acting on the rotor prime mover, along with manual control and adjusting instrumentalities. The invention is a division of Patent Application Serial No. 577,229, filed April 10, 1956, now Patent No. 2,957,687 issued October 25, 1960.

A conventional helicopter rotor control system includes a member to adjust collective pitch of the rotor blades along with a grip on the member movable to adjust the throttle. Collective pitch adjustment is a primary control for the air vehicle to regulate its lift; adjustment of the engine throttle is a concurrent primary control to maintain rotor speed at a desired level during changes in load on the rotor resulting from lift changes. It is desirable, to simplify the pilot's activities, to enable rotor speed to be governed at times, avoiding the need for concurrent manual collective pitch and throttle adjustment. Yet changes in the rotor speed must always be within the pilot's immediate command to enable him to change governor setting or to enable manual throttle control.

Other desirable features in a rotor speed governor system include arrangements to prevent rotor overspeed, to provide accurate and fast throttle response by incorporating derivative stabilization in the governor action, to provide for governor speed adjustment concurrently with, and following rotor speed adjustment when the governor is disconnected from throttle control, to provide throttle grip follow-up of governor action when the rotor is under governor control; to provide for closed engine throttle for shut down when the control is connected to the governor, and to provide means for the governor to act automatically as a speed limiter when the system is set for manual control.

Objects of the invention are to provide a governor control system to meet the foregoing, and other, desirable features, and to provide a compact, all-mechanical apparatus which is positive and independent of secondary power supplies or sources. Other objects of the invention will appear as a more detailed description of the invention porceeds.

Figure 3:
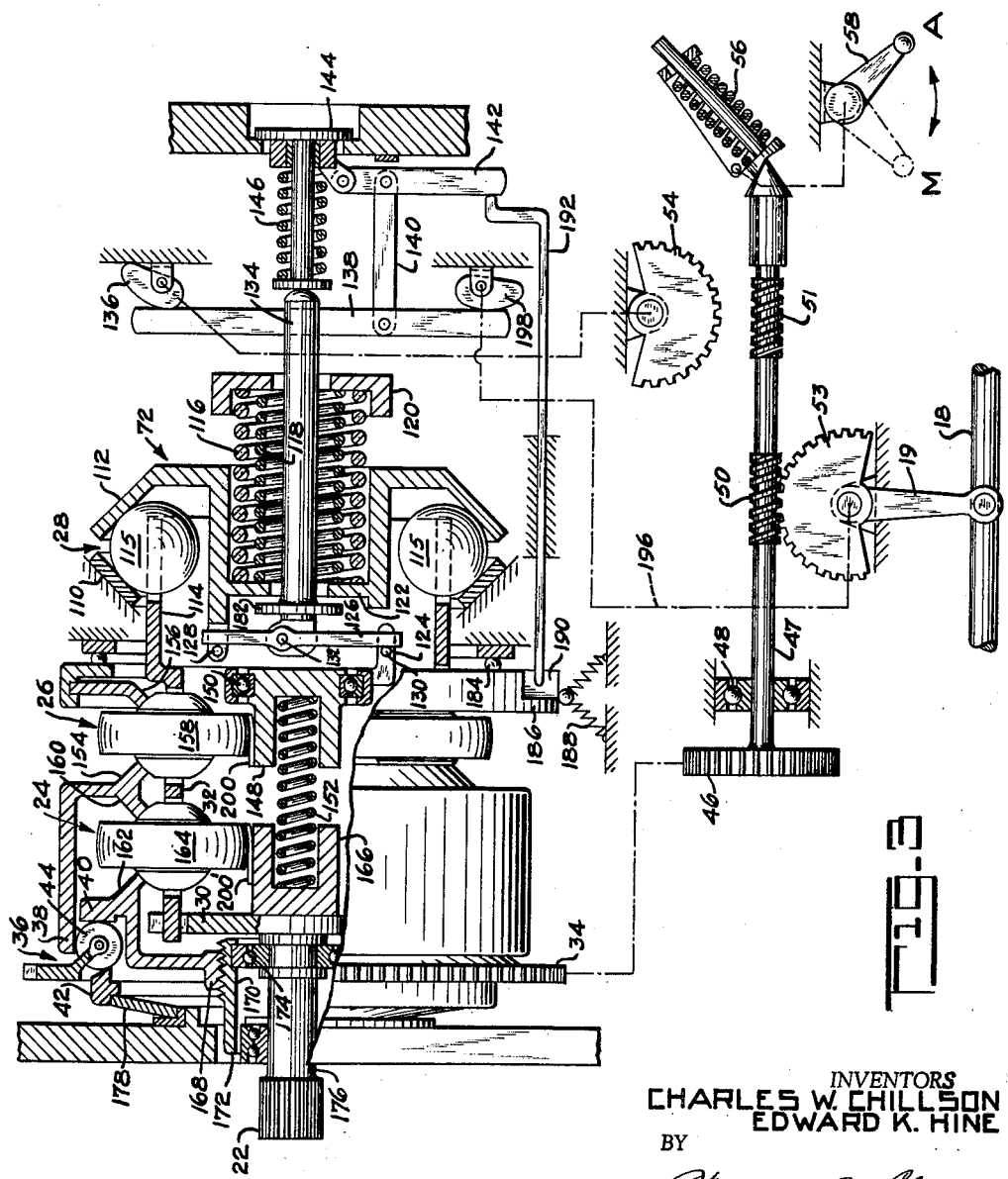
Figure 4:
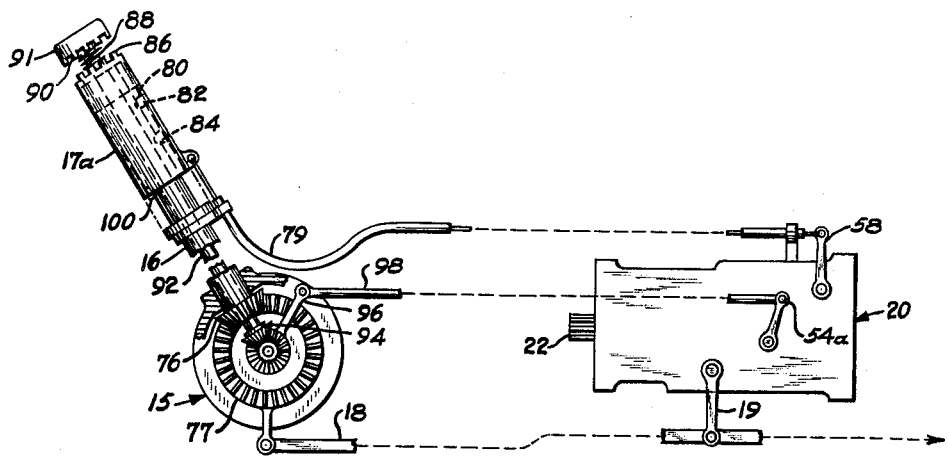
Figure 5:
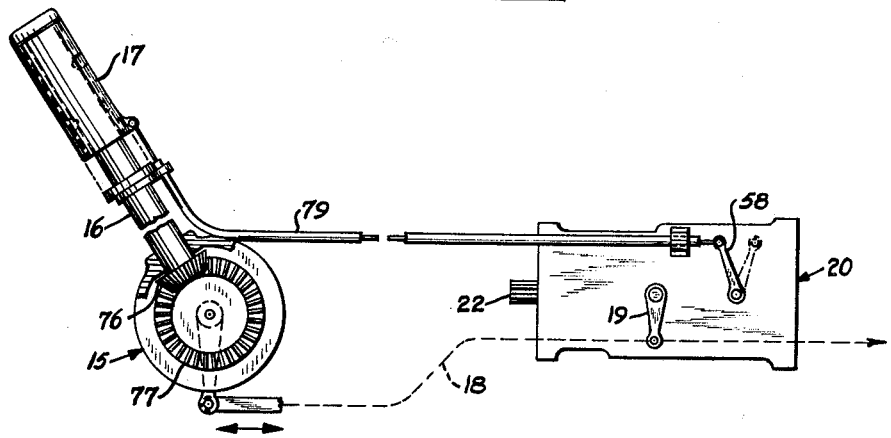

Principal features of the invention are shown in the annexed drawings, in which similar reference characters designate similar parts, and in which:

FIG. 1 is a generalized side elevation of a helicopter showing the usual arrangement of certain principal components, along with a practicable location for a rotor governor, FIG. 2 is a schematic diagram of one command arrangement for a helicopter governor and throttle, FIG. 3 is a schematic longitudinal section of a governor, FIGS. 4 and 5 are schematic diagrams of alternative helicopter governor and throttle command arrangements.

For general orientation, reference may be made to FIG. 1 wherein a helicopter fuselage is indicated by the outline 6. A vertical shaft 7 is driven by a prime mover or engine 8 of any desired type, the shaft driving the rotor or rotary wing system 9. A power take-off 10 may drive a shaft 11 leading to a tail rotor, used for directional control as is well known. A prime mover or engine speed and power controller is indicated at 12, wihch may comprise part of the fuel control system to the prime mover.

The rotor 9, while having other controls, not shown, such as cyclic pitch control, includes a collective pitch adjuster known in the art and indicated by the rectangle 13. Collective pitch is adjusted by a control rod 14, linked to a control assembly 15, and operated by a pilot-manipulated collective pitch lever 16. The lever carries a rotatable throttle grip 17, drivably connected through suitable mechanism, not shown, to a control rod 18 connected to the controller or throttle 12. This rod is also connected to actuate, or be actuated by, an output arm 19 of a governor assembly 20. The description will now be directed to parts of the governor.

The governor includes input shaft 22 driven by the prime mover at fixed speed ratio. This drives an integral speed changer 26 and a proportional speed changer 24 and a ball speeder section 28 through a plate 30 and a drive cage 32. Action of the governor rotates an output gear 34 through a ball differential 36 comprising two driven rings 38 and 40, a reaction ring 42, and a ball cage 44, the latter being secure on the gear 34. The output gear 34 drives a pinion 46 secured on a shaft 47 which is angularly rockable through a small angle in a bearing 48. This shaft carries two worms 50 and 52, the former being engageable with a wheel 53, and the latter with a wheel 54. By shifting the shaft 47 by an over-center toggle mechanism 56, operated by a manual control 58, worm 50 is engaged with wheel 53, or worm 51 is engaged with wheel 54. The former is the "automatic," or governor control connection wherein the governor output shaft 47 drives the throttle of the engine through rod 18 to maintain the engine speed to that for which the governor is set. The latter is the "manual" control connection wherein the throttle rod is actuated manually while the governor speed setting may follow the actual speed of the engine. The wheel 54 adjusts the governor speeder setting and, as will be seen, an additional manual setter may be used in conjunction with, or may supplant, the setting wheel 54.

Now reference may be had to FIG. 2 which shows a presently preferred command arrangement for the governor. The governor 20 is driven by powerplant 8 through a mechanical drive connection 62; the twist grip 17 of the lever 16 is connected by gearing 64 through the rod 18 to the governor output lever 19 and the engine throttle 12. The governor is provided with a solenoid 66 acting on an armature 67 linked to the governor manual-automatic selector 58. A circuit for solenoid 66 includes a power source 68, a master switch 69, and a button switch 70 mounted atop the throttle grip 17. This button switch may be one which is normally up to close the circuit of solenoid 66, and which is pushed to open the circuit. The circuit is arranged preferably for closure to move lever 58 to the "automatic" setting, and for opening to move lever 58 to "manual." This renders the arrangement fail-safe in case of electrical failure as will be described. A button latch or hold-down may be provided to retain the system in "manual" control condition.

When the circuit is closed, the governor is connected to operate the engine throttle; the grip 17 follows governor energized throttle adjustment whereby the pilot may at all times sense throttle action. When the circuit is open, governor control of the throttle is disconnected and the throttle is manipulated directly by the grip 17. During manual throttle operation, the governor lever 19 is moved to reset the governor speed setting to the engine speed resulting from the then current throttle setting. Thus, when shifting between manual and automatic, there is no sudden call for a drastic speed change. For instance, suppose the system is on "automatic" and a change is desired from speed A to speed B. The pilot shifts from "automatic" on speed A to "manual" and adjusts the throttle grip 17 to attain speed B. During the manual speed transition, the governor desired speed setting follows the actual speed so that when the shift is again made from manual to automatic, the new automatic operation will be at speed B.

In the governor, an element 72 (FIG. 2) is provided which moves in accord with instant engine speed. This, when some desired maximum speed may be reached, closes a switch 73 in parallel with switch 70, shifting the governor to "automatic" operation if it had been on "manual." The governor takes command of the throttle to prevent further speed increase, thus acting at a speed limiter. Should it be necessary for the pilot to retain manual command of the system, regardless of overspeed, he can open the master switch 69, which prevents shift of the governor to, or retention in, the "automatic" position.

FIG. 4 shows a alternative command arrangement wherein the governor 20 is provided with an independent governor speed setting control 54a corresponding to the worm wheel 54 in FIG. 3 by which governor speed setting is adjusted. In FIG. 4, the collective pitch control lever 16 is provided with a rotatable and slidable throttle grip 17a slidable on and rotatable with and with respect to the tubular, rotatable lever 16. The lever 16, as previously covered, is swingable about a pivot and controls collective pitch. It is also rotatable about its own axis, carrying a bevel pinion 76 engaged with a bevel gear 77, the latter operating the throttle control rod 18. Axial movement of the grip 17a on the lever 16 operates a push-pull assembly 79 of any suitable type, which connects to the manual-automatic shift lever 58 on the governor 20. The arrangement is such that downward movement of the grip 17a shifts lever 58 to "manual" and upward movement to "automatic." The grip is shown in its normal upward position whereat it is held by a detent 80 on the lever 16, engaging an opening 82 in the grip. In its downward position the grip 17a is held by a detent 84 which engages the grip opening 82. The grip 17a is provided with teeth 86 at its upper end, and is movable upwardly against a spring 88, beyond the said normal upward position. When so moved, teeth 86 engage teeth 90 of a rotatable cap 91 secured to a rod 92 passing through the lever 16, to bevel pinion 94 adjacent the lever swing pivot. Pinion 94 engages a bevel gear 95, coaxial with gear 97, which has a lever 96 connected to a push-pull connection 98, connected to and actuating the governor speed setting lever 54a.

Grip 17a is keyed to lever 16 at 100 and rotates with it at all times except when the grip is raised against spring 88 to adjust governor setting. When so raised, the grip disengages the key 100, but re-engages it as soon as the governor setting adjustment is complete. Under both manual and automatic operating conditions the grip rotates with lever 16; in "automatic," the grip follows the governor, while in "manual," the grip controls throttle setting. The arrangement described provides a complete one-hand control for collective pitch, throttle actuation, governor selection and governor setting.

In an arrangement of this sort, the worm connection 51—54 of FIG. 3 is omitted since the governor setting is controlled separately by the lever 54a, instead of by coupling at times to the governor output.

FIG. 5 shows another command system which is, in effect, an all-mechanical arrangement functionally like the command arrangement of FIG. 2. Herein, the grip 17 rotates the gears 76 and 77 and either drives (in manual control) or is driven by (in automatic control) the control rod 18 leading to the governor and engine throttle. As in FIG. 4, sliding of the grip in or out along the collective pitch lever moves the governor selector to "manual" or "automatic" respectively through a connection such as the push-pull cable 79. When the grip 17 is in the "manual" position, governor setting follows the speed of the engine through the governor mechanism shown in FIG. 3, as well as the grip 17 controlling the engine throttle directly through the connection 18. When the grip 17 is shifted to "automatic," the governor controls the engine throttle, to hold the speed at which the engine was operating at the time the shift from manual to automatic was made. When operating on "automatic," governor action is transmitted to the grip 17 for "feel" by the pilot.

There are many possible variations and modifications for the command system, and the three shown in FIGS. 2, 4 and 5 are chosen as non-limiting, practical and desirable examples.

Reference should be had again to FIG. 3. The description of the governor shown therein, already given, was incomplete inasmuch as it referred only to components having a direct connection with the control and command system. Following is a more detailed description which will promote a more complete understanding of governor construction and operation. The speeder section 28 of the governor comprises a non-rotating conical race 110, and an opposed, axially movable non-rotating conical race 112, forming part of the member 72. Between these races a plurality of balls 115 are disposed, these being spaced circumferentially by a driving retainer 114 connected with the driving sleeve 32 and driven by the input shaft 22 through the drive plate 30. As the balls are spun about the governor axis by rotation of shaft 22, they exert centrifugal force against the races 110 and 112, tending to spread them apart; specifically, tending to move the race 112 rightwardly as shown. This movement is resisted by the speeder springs 116 and 118, which are held at their right ends by a fixed cup 120, and which bear at their left ends on a cup 122 integral with the member 72 carrying the race 112. The balls 115 rotate against the races 110 and 112 and assume a circular orbit whose radius is a function of the rotational speed of the shaft 22. Also, the race 112 and cup 122 assume an axial position which is a function of rotational speed. Thus, for any specific speed of the speeder system there is a corresponding axial position of the cup 122.

When a certain set speed is desired, the position of the cup 122 is established relative to a speeder output member 124 with the latter in a neutral position. This position is attained through a differential lever 126, the upper end of which is engaged under normal conditions by a pin 128 on the member 72. The lower end of the lever normally engages a pin 130 on the output member 124, and the lever is pivoted intermediate its length, at 132, on a speed setting member 134.

The latter is axially adjustable by a speed setting cam 136, adjusted by the speed setting wheel 54, through a lever 138, a link 140 and a lever 142. This is pivoted to a bushing 144 and engages a pushrod 146 in turn engaging the speed setting member 134. The cam 136 and associated elements are held from free rotation when the worm 51 and wheel 54 are disengagegd by a light drag brake, not shown.

The speeder section output member 124 is secured for axial movement with and for rotation relative to an adjuster 148 through a thrust bearing 150, the adjuster 148 being urged rightwardly by a spring 152. By this spring, the adjuster pin 130 is held against the lever 126, and the lever is held against the pin 128 so that the adjuster is caused to follow axial excursions of the cup 122 for any fixed setting of the pivot 132.

The adjuster 148 which comprises the shifter for the integral ball speed changer 26 acts through leaf spring 200 connecting these parts. The speed changer is driven by the sleeve 32 and operative to rotate its output race in one direction or the other relative to a fixed race 156 according to the tilt of the ball unit 158. This ball speed changer is of the type shown and claimed in Patent No.

2,860,530 of Edward K. Hine and Charles W. Chillson issued November 18, 1958. The speed changer output race 154 moves according to the integrated speed error of the governor shaft 22 relative to the set speed datum established by the position of the speed setting member 134. The output race 154 of speed changer 26 is integral with two other races; namely, an input race 160 to the second speed changer 24, and the input race 38 to the output differential 36 of the governor assembly.

The second speed changer 24, similar in general to 26, includes an output race 162, ball assemblies 164, a ratio adjuster 166 and leaf spring 200' connecting adjuster 166 with assemblies 164. The output race 162 is integral with the input race 40 of ball differential 36, and also is integral with a nut 168. This nut engages a non-rotating axially shiftable screw 170, held from rotation by a tang 172 engaging the governor housing.

The screw 170 carries a thrust bearing 174 engaging a shaft 176 which joins the drive dog 22 to the plate 30 and ratio adjuster 166, these rotating elements being axially shiftable with the nut 168 through the bearing 174. Axial shifting of the adjuster 166 regulates the drive ratio of the speed changer 24 in transmitting movement from race 160 and race 162. The speed changer 24 operates to mathematically differentiate, or calculate the first derivative of the integrated speed error represented by rotation of the race 154. Thus, the position of the races 162 and 40 is proportional to the speed error. The screw connection 168—170 operates to adjust the ratio of the speed changer 24, and to restore the changer to 1:1 ratio upon eradication of speed error.

The differential 36 sums the integral and proportional speed error outputs of the two speed changers and its output gear 34 moves according to the summed quantities. Thus, the position and movement of the gear 34 represents a derivative stabilized signal, applied to the gear 46 and related mechanism. This gear 46 calls for (1) throttle adjustment to restore engine speed to normal if the selctor 58 is set for automatic control or (2) governor speed setting adjustment to correspond to the existing speed of governor input 22 if the selector 58 is set for manual control.

In addition to the governor structure described, several additional features are incorporated.

The spring 152, acting between speed changer adjusters 148 and 166, tends to urge both of them toward ratio positions which are opposite to those which are urged by operation of controlling instrumentalities.

The required frictional engagement of the speed changer races and their balls, and of the components of the ball differential 36, is all secured through the force exerted by a single loading spring 178 acting between the governor housing and the sloped-face reaction race 42 of the differential 36.

The governor incorporates additional automatic control provisions, to provide overspeed protection to close the throttle of the engine at a pre-selected low speed when the engine is shut down, and to provide compensations in the speed setting of the governor due to load conditions. These will be described in the order above set forth.

As formerly described briefly, should the engine and governor tend to increase in speed when the command system is set for manual control (see FIG. 3), the speeder section member 72 will move to the right. The position of this member, as implied before, is a direct function of speed. In FIG. 2, the element 72 which corresponds to the member 72 of FIG. 3, is operative, at a certain speed, to close the switch 73 energizing the solenoid 66 and placing the system on automatic control instead of manual control.

Thereupon, depending on the adjustment of switch 73 as to the speed of the governor at which it closes, the governor will control the engine throttle to prevent further speed increase. Should the pilot deliberately choose an over-speed operating condition, he may open the master switch 69 to prevent automatic system operation.

In a helicopter or other governed system, it is generally desirable to close the engine throttle when the engine is shut down to enable restarting of the engine with closed or substantially closed throttle. In effect, this imposes a need for automatic throttle closing when the engine speed drops below a certain level, say ¾ of normal engine idling speed. Shutting off of the engine is normally accomplished by leaning the fuel-air mixture to the engine or by cutting ignition or both.

In the governor described herein, a decrease in speed normally results in moving member 72 to the left which creates a call for open throttle, to provide more power to bring the speed up to the set value. Upon engine shut down, this is opposite to the effect desired. To close the throttle on shut down, when the member 72 moves leftwardly in response to low speed, the portion 122 of this member moves leftwardly and engages an abutment 182 secured on the stem 134, forcing the pivot 132 leftwardly. The lever is thus moved bodily to the left, stroking the speed changer adjuster 124 leftwardly and operating the speed changers to drive the output gears 34 and 46 to a throttle closing position, through elements 47, 53, 19 and 18.

When a throttle load change occurs, the load change is reflected into the speed changers and creep may occur therein which, if not compensated, introduces throttle setting errors. Means are provided, proportional to the torque load on the speed changers, to compensate this creep which has the effect of removing regulation errors due to speed changer operation. Mechanism for this purpose includes an oscillatory mounting 184 for the non-rotating speed changer race 156 and its carrier 186, the race and carrier being urged to a certain position by tangentially acting springs 188. The carrier 186 includes a sloped cam 190 which is engaged by a push rod 192 in contact with the link 142 of the adjusting mechanism. Upon torque reaction displacement of the carrier 186, the elements 192 and 142 adjust the ratio adjuster 124, 148 an incremental amount to compensate speed changer creep, at least in part.

The governor shown herein is isochronous, which under most conditions is a most desirable characteristic, since a desired speed is maintained regardless of throttle setting or driven load. Under some conditions of operation, droop in the system is desirable and means are provided to incorporate droop to any degree desired. To this end, the wheel 53, whose rotational position is directly related to throttle position through the connections 18 and 19, is drivably connected at 196 to a cam 198 engaging the link 138 of the speeder adjusting mechanism. The cam is formed to increase or decrease the governor speed setting according to throttle position, to insert droop to any desired degree.

In a system wherein two governed prime movers are driving a single load, a small amount of droop is needed in the governors so that the two prime movers can each drive their share of the load at desired speed. The cam 198 might be shaped to provide for this.

In a helicopter, a different governor sensitivity is required in the low engine power range when the engine is decoupled from the rotor, from the higher power range when the engine and rotor are coupled. The cam 198 furnishes a means for providing an effective difference in governor sensitivity between the high power and the low power range. At throttle settings corresponding to the rotor driving range, the cam 198 may be shaped to yield no speed setting change or droop.

The governor just described is to be taken as but one example of various governor arrangements which might be used in control systems embodying concepts of the invention. Any other governors with generally similar functional attributes may be used.

Also, it should be understood that while several command systems embodying the features of the invention have been presented, other forms of the invention are also possible. Various changes and modifications may be made in the particular forms of the invention shown and described without departing from the spirit and scope of the invention as defined in the appended claims.

We claim:

1. In combination, governor mechanism for controlling the speed of a prime mover, the governor mechanism including means for adjusting the speed setting therof, a mechanical linkage means which includes an output shaft and an input shaft rotatable by the governor mechanism, said input shaft being adapted to operate said output shaft, a control element connected to said linkage means and adapted to manually operate said output shaft, selector means operated in conjunction wtih said control element to switch the operation of said output shaft from said input shaft to said control element and vice versa, and means for connecting said input shaft to said speed setting means when the output shaft is disconnected from the input shaft.

2. In combination, a prime mover, governor mechanism driven thereby for controlling prime mover speed, the governor mechanism including an element movable according to prime mover speed, a mechanical linkage means which includes an output shaft connected with the prime mover and an input shaft rotatable by the governor mechanism, said input shaft being adapted to operate said output shaft, a control element connected to said linkage means and adapted to manually operate said output shaft, selector means operated in conjunction with said control element to switch the operation of said output shaft from said input shaft to said control element and vice versa, and means responsive to certain positioning of the first mentioned element resulting from overspeed of the prime mover to connect the input shaft to the output shaft should the output shaft then be under manual control.

3. A control system comprising a mechanical linkage means which includes an output shaft and a rotatable input shaft, said input shaft being adapted to operate said output shaft, a control element connected to said linkage means and adapted to manually operate said output shaft, and selector means operated in conjunction with said control element to switch the operation of said output shaft from said input shaft to said control element and vice versa, said control element including a twist grip movable about its own axis for operating said output shaft and movable axially for actuating said selector means.

4. A control system comprising a mechanical linkage means which includes an output shaft and a rotatable input shaft, said input shaft being adapted to operate said output shaft, a control element connected to said linkage means and adapted to manually operate said output shaft, and selector means operated in conjunction with said control element to switch the operation of said output shaft from said input shaft to said control element and vice versa, said control element including a twist grip movable about its own axis for operating said output shaft and a switch on the twist grip for actuating said selector means.

5. In combination, a prime mover, governor mechanism driven thereby for controlling prime mover speed, the governor mechanism including means for adjusting the speed setting thereof, a mechanical linkage means which includes an output shaft connected with the prime mover and an input shaft rotated by the governor mechanism, said input shaft being adapted to operate said output shaft, a rotatable and axially shiftable control element connected to said linkage means, and selector means responsive to axial shift of the control element to switch the operation of said output shaft from said input shaft to said control element and vice versa, mechanism responsive to rotation of the control element in one axial position for actuating said output shaft, and mechanism responsive to rotation of the control element in another axial position for actuating the means for adjusting the speed setting of the governor mechanism.

References Cited in the file of this patent

UNITED STATES PATENTS

| | | |
|---|---|---|
| 2,491,372 | Gille | Dec. 13, 1949 |
| 2,619,342 | Sparrow | Nov. 25, 1952 |
| 2,613,751 | Donovan et al. | Oct. 14, 1952 |
| 2,640,551 | Plumb | June 2, 1953 |
| 2,664,958 | Dancik | Jan. 5, 1954 |
| 2,679,296 | Morain | May 25, 1954 |
| 2,742,792 | Lacoste | Apr. 24, 1956 |
| 2,941,601 | Best | June 21, 1960 |